(12) United States Patent
Saint-Jalmes et al.

(10) Patent No.: US 7,770,845 B2
(45) Date of Patent: Aug. 10, 2010

(54) DOUBLE MODULE FOR AIRCRAFT PASSENGER(S)

(75) Inventors: Bruno Saint-Jalmes, Toulouse (FR); Andre Rezag, Toulouse (FR); Jason Zaneboni, Toulouse (FR)

(73) Assignee: Airbus, Blagnac (FR)

( * ) Notice: Subject to any disclaimer, the term of this patent is extended or adjusted under 35 U.S.C. 154(b) by 332 days.

(21) Appl. No.: 11/449,610

(22) Filed: Jun. 9, 2006

(65) Prior Publication Data

US 2007/0152100 A1 Jul. 5, 2007

Related U.S. Application Data

(60) Provisional application No. 60/697,350, filed on Jul. 8, 2005.

(30) Foreign Application Priority Data

Jun. 10, 2005 (FR) .................................. 05 05902

(51) Int. Cl.
*B64D 11/06* (2006.01)
(52) U.S. Cl. ........................ 244/118.6; 5/118
(58) Field of Classification Search ............... 244/118.5, 244/118.6, 122 R; 105/344, 314; 5/118, 5/9.1; 297/118, 248
See application file for complete search history.

(56) References Cited

U.S. PATENT DOCUMENTS

| | | | | |
|---|---|---|---|---|
| 658,202 | A | * | 9/1900 | Bibby ......................... 114/189 |
| 2,147,011 | A | * | 2/1939 | Crawford ..................... 105/315 |
| 2,309,665 | A | | 2/1943 | Parke |
| 2,504,769 | A | * | 4/1950 | Watter ......................... 105/315 |
| 6,929,321 | B1 | * | 8/2005 | Shrock ........................ 297/118 |
| 2005/0012363 | A1 | | 1/2005 | Ferry et al. |
| 2005/0087650 | A1 | * | 4/2005 | Quan et al. .............. 244/118.6 |

FOREIGN PATENT DOCUMENTS

| FR | 2 842 497 A | 1/2004 |
|---|---|---|
| FR | 2 843 730 A | 2/2004 |
| SU | 355069 | 10/1972 |
| WO | WO 2005/080196 A | 9/2005 |

OTHER PUBLICATIONS

Russian Decision to Grant dated Apr. 23, 2010, with English translation of the pertinent parts thereof, including the above Russian reference.

* cited by examiner

*Primary Examiner*—Timothy D Collins
*Assistant Examiner*—Michael Kreiner
(74) *Attorney, Agent, or Firm*—Oblon, Spivak, McClelland, Maier & Neustadt, L.L.P.

(57) ABSTRACT

A module for aircraft passenger(s) is provided with two seats disposed beside one another and oriented in the same direction, each of these seats being a seat that can be converted to a berth. The module also includes a side wall surrounding the two seats, at least partly, an opening provided in the side wall to permit access to the module, and a partition intended to achieve separation between the two seats. The partition is displaceable from a first position, in which it achieves separation of the two seats, to a second stored position, in which it does not form a barrier between the two seats.

22 Claims, 3 Drawing Sheets

DOUBLE MODULE FOR AIRCRAFT PASSENGER(S)

BACKGROUND OF THE INVENTION

1. Field of the Invention

The present invention relates to a double module for aircraft passenger(s).

2. Discussion of the Background

Most airline companies offer their passengers three levels of travel comfort. By increasing comfort level, therefore, there generally are in an aircraft (for medium or long flights) an economy class, a business class and a first class. These different classes have different names depending on the airline company with which a person is flying.

Most often, in an aircraft cabin, seats of a first type are used for first class, next to the aircraft cockpit, seats of a second type are used for business class, generally immediately aft of first class, and finally seats of a third type are used in economy class, near the rear of the aircraft. For a given aircraft, the configuration chosen is most often fixed. For airline companies, however, it is of interest to vary the distribution among the number of seats offered in the three classes. Thus it is known to modify the interior configuration of an aircraft by replacing the first-class seats by business-class seats or vice versa. This operation is very time-consuming, and it necessitates a very long ground time on the order of five days, because it is necessary to remove and reinstall seats and accessory units.

SUMMARY OF THE INVENTION

The objective of the present invention is therefore to provide means with which the ground time of an aircraft can be shortened while part of its business class is being converted to first class or vice versa.

To this end, the invention proposes a module for aircraft passenger(s) provided with:

- two seats disposed beside one another and oriented in the same direction, each of these seats being a seat that can be converted to a berth,
- a side wall surrounding the two seats, at least partly,
- an opening provided in the side wall to permit access to the module, and
- a partition intended to achieve separation between the two seats, this partition being displaceable from a first position, in which it achieves separation of the two seats, to a second stored position, in which it does not form a barrier between the two seats.

Such a module can accommodate two passengers, who can then travel either in seated position or in recumbent position. This corresponds to the standard of most airline companies as regards business-class comfort. By virtue of the configuration of the module, it can be arranged in various ways. Firstly, the partition can be disposed in such a way that it no longer creates separation between the two seats. The module can then accommodate two business-class passengers who know one another and wish to be together. It is also conceivable to transform one seat to a berth and to leave the other seat in its upright position. The interior of the module then forms a private space for a passenger to stretch out or sit up. The berth can also be used as a banquette.

In order to achieve even more variability, it is proposed that the module according to the invention be additionally provided with elements such as foamed plastic elements, with which the interior space of the module can be shaped. Such elements make it possible to configure the space inside the side wall as desired. It is then possible to modify the module in such a way that an uninformed passenger does not become aware that the module reserved for a first-class passenger corresponds to two modules of a business-class passenger. In this embodiment, the elements used make it possible, for example, to transform a berth to a banquette with back.

Advantageously, a module according to the invention is provided with a storage space intended in particular to accommodate elements for organization of the interior space of the module. This storage space is disposed under the seats, for example. Depending on the configuration of the cabin, a hatch provided in the side wall may permit access to the storage space.

A preferred embodiment of the invention provides that the side wall surrounding the two seats defines a substantially rectangular space, the two seats occupying substantially the entire width of that space and being disposed at one end thereof. Such a form and such a disposition make it possible to optimize the space in an aircraft cabin and, for a given cabin, make it possible a priori to accommodate the largest number of passengers without detracting from their comfort.

The side wall preferably has an opening disposed facing the seats and in middle position relative thereto. In this case, the same opening permits access to two seats in business class and permits access to the first-class module. This disposition is advantageous, because it avoids having two openings in the side wall, one of these openings then not being useful when the module is intended for a first-class passenger.

An alternative embodiment provides that the partition is, for example, a partition that slides between a first high position, in which it achieves separation between the two seats, and a second low position, in which it is entirely retracted between the two seats.

According to another alternative embodiment, the partition can be a removable partition. In this alternative embodiment, a reserve space is advantageously provided to accommodate the partition when it is removed.

A module for aircraft passenger(s) according to the invention is preferably provided with seats such that each seat has a fixed frame. This makes it possible to limit the space requirement of the seats in the module and therefore to leave more space for the passenger(s). With such a seat, it is possible to provide that a supplementary berth can cooperate with the seat to form a substantially plane surface capable of accommodating a passenger in recumbent position. Such seats and supplementary berths are described in French Patent FR 2860194, for example.

The present invention also relates to an aircraft cabin and to an aircraft, characterized in that they are provided with at least one module such as described in the foregoing.

BRIEF DESCRIPTION OF THE DRAWINGS

Details and advantages of the present invention will be better understood from the description hereinafter with reference to the attached schematic drawings, wherein:

FIG. 1 shows a first-class zone 2 as well as a business-class zone 4 in an aircraft cabin.

DETAILED DESCRIPTION OF THE PREFERRED EMBODIMENTS

Figure 1:
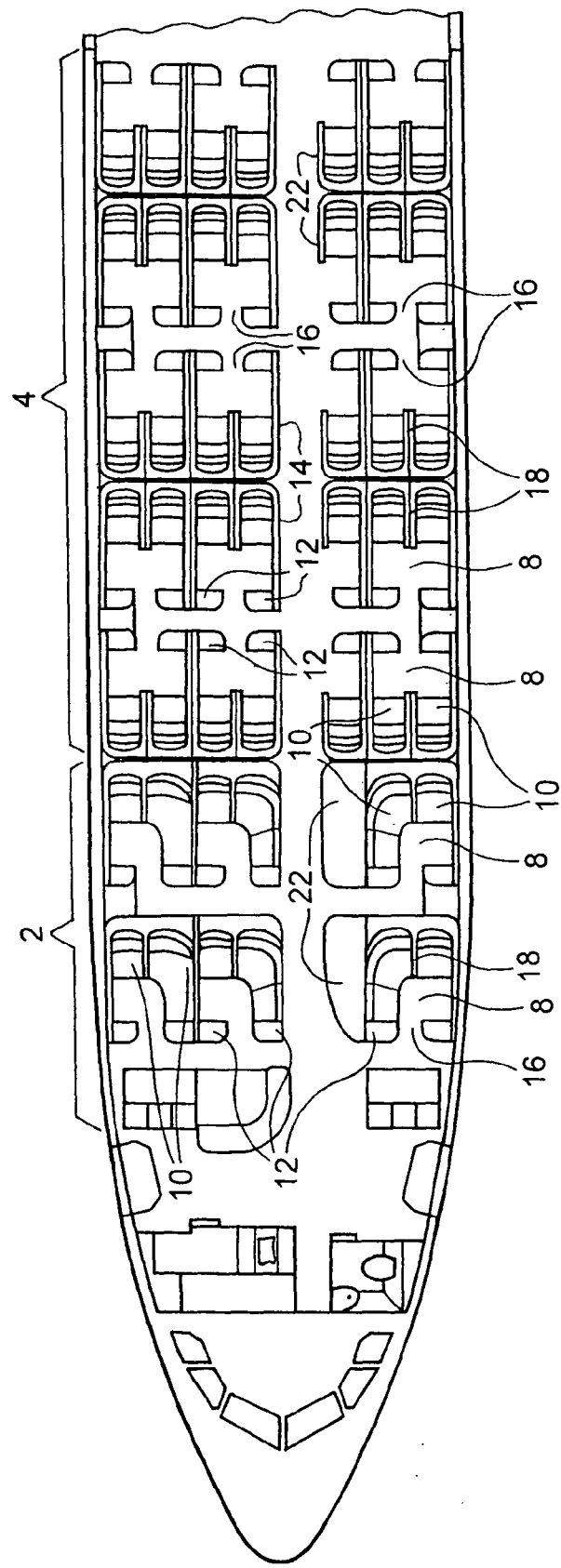
FIG. 1 is a schematic horizontal projection of an aircraft cabin zone encompassing the first classes and the business classes.

In the cabin illustrated in FIG. 1, the structure of the seats and modules used in first-class zone 2 is identical to that of the seats and modules of business class 4. Only the arrangement of the modules is different.

The basic element used here for arrangement of first-class zone 2 and business-class zone 4 is a double module 8, which can be organized to accommodate either one single first-class passenger or two business-class passengers. An example of a module of this type is described hereinafter with reference to the attached schematic drawings.

Figure 2:
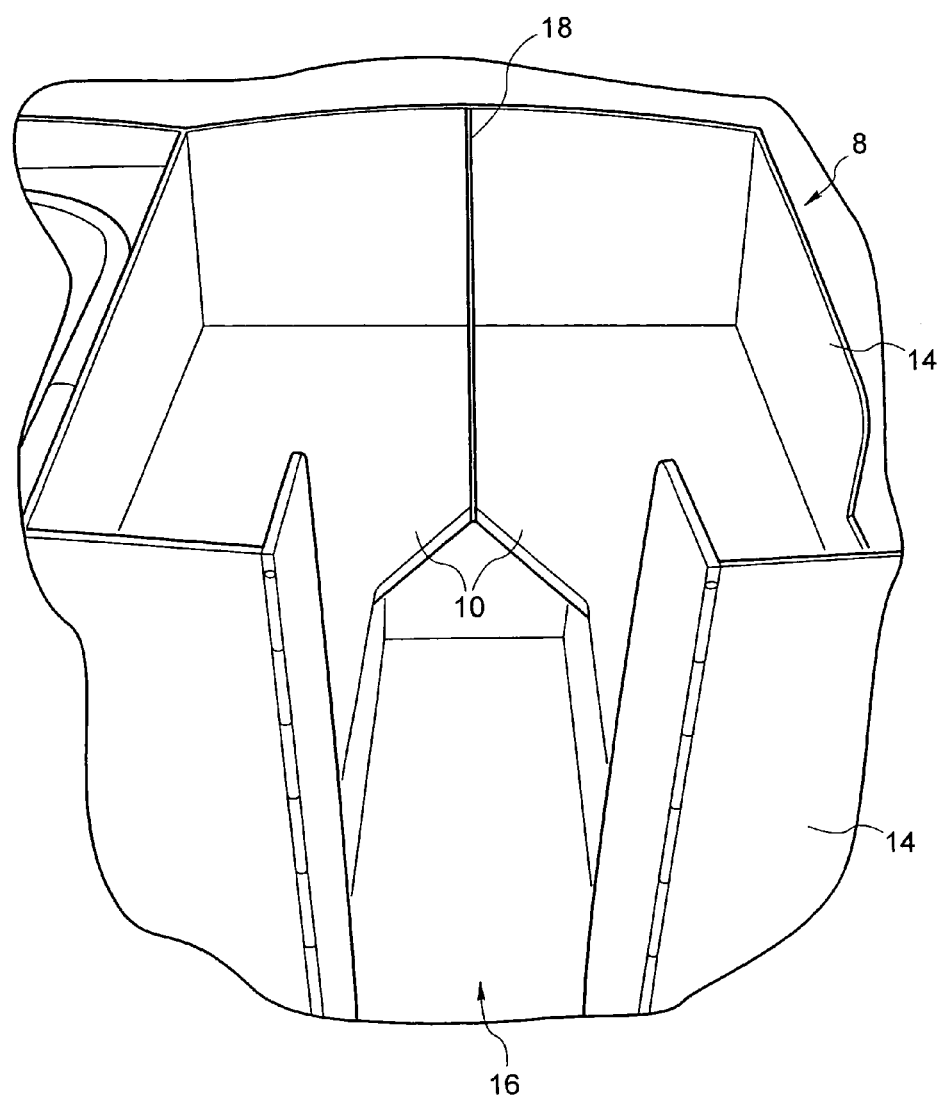
FIG. 2 is a perspective view of a module according to the invention when it is intended for a business-class space.

In business-class zone 4 of FIG. 1, it is seen that each of the double modules 8 has two seats 10. Facing each of these seats 10, and spaced apart therefrom, there is disposed an accessory unit 12, which may be, for example, a baggage compartment, a small table, a footrest or even a cabinet in which a television screen, for example, is integrated. Preferably this accessory unit 12 is provided with a support surface disposed substantially (for example, within twenty cm) at the same height as the bottom of corresponding seat 10. This seat is a convertible seat. The support surface of accessory unit 12 then cooperates with the convertible seat and if necessary with a supplementary berth to form a sleeping surface providing a bed for the passenger, as illustrated in FIG. 2.

Each double module 8 intended to accommodate one first-class passenger or two business-class passengers is defined by a side wall 14. By passing behind the seats, this wall surrounds the seats as well as accessory units 12. This side wall 14 may have substantially constant height or, for example, may be higher next to seats 10 than next to accessory units 12. As a non-limitative example, it may be considered, for example, that the side walls defining double modules 8 have a height between 0.60 m and 1.50 m.

On the whole, side wall 14 has substantially rectangular shape. Seats 10 are disposed at one end of module 8, and occupy substantially the entire width of the module. As regards accessory units 12, they have smaller width than the seats. These accessory units are disposed in the corners of module 8 at the side opposite seats 10.

An opening is provided in each side wall 14 to permit access to seats 10. This opening 16 is made between accessory units 12. A door or a gate may be provided if necessary in order to close each opening 16.

Each double module 8 illustrated here is substantially symmetric relative to an axis passing between the two seats 10 and via the middle of opening 16. This symmetry plane is given physical form by a partition 18 disposed between the two seats 10. This partition 18 achieves separation between the two seats in such a way that the two passengers traveling in the double module when it is organized for business class can be isolated from one another. In this way the private space of each of the passengers is preserved.

This partition 18 is a movable partition. In its first position described hereinabove it achieves separation between the two seats 10 and transforms double module 8 to two single modules. Nevertheless, when the two passengers (in business class) know one another and wish to be together, this partition 18 then assumes a second position in which it no longer achieves this separation. A mechanism can then be provided to lower partition 18 and make it disappear between the two seats 10. Conceivably this partition also may be removed. The removed partition then may be placed, for example, in a reserve space (not illustrated) provided in the thickness of side wall 14, for example behind the two seats 10.

As indicated hereinabove, seats 10 are convertible seats. They are preferably seats such as those described in French Patent 2860194. Reference is made here to that document as regards the description of the seats used here as well as a possible supplementary berth cooperating with the seat to form a plane surface capable of accommodating a passenger in recumbent position. The seats described in that document have the advantage that their weight is lighter and that they do not necessitate installation of bulky motors to move them from the upright position to the position converted to a berth. By virtue of this fact, a large space is available underneath the bottom of seats 10. Of course, the present invention can be implemented with seats different from those described in the aforesaid patent application, but the embodiment of these seats is the embodiment preferred here.

Figure 3:
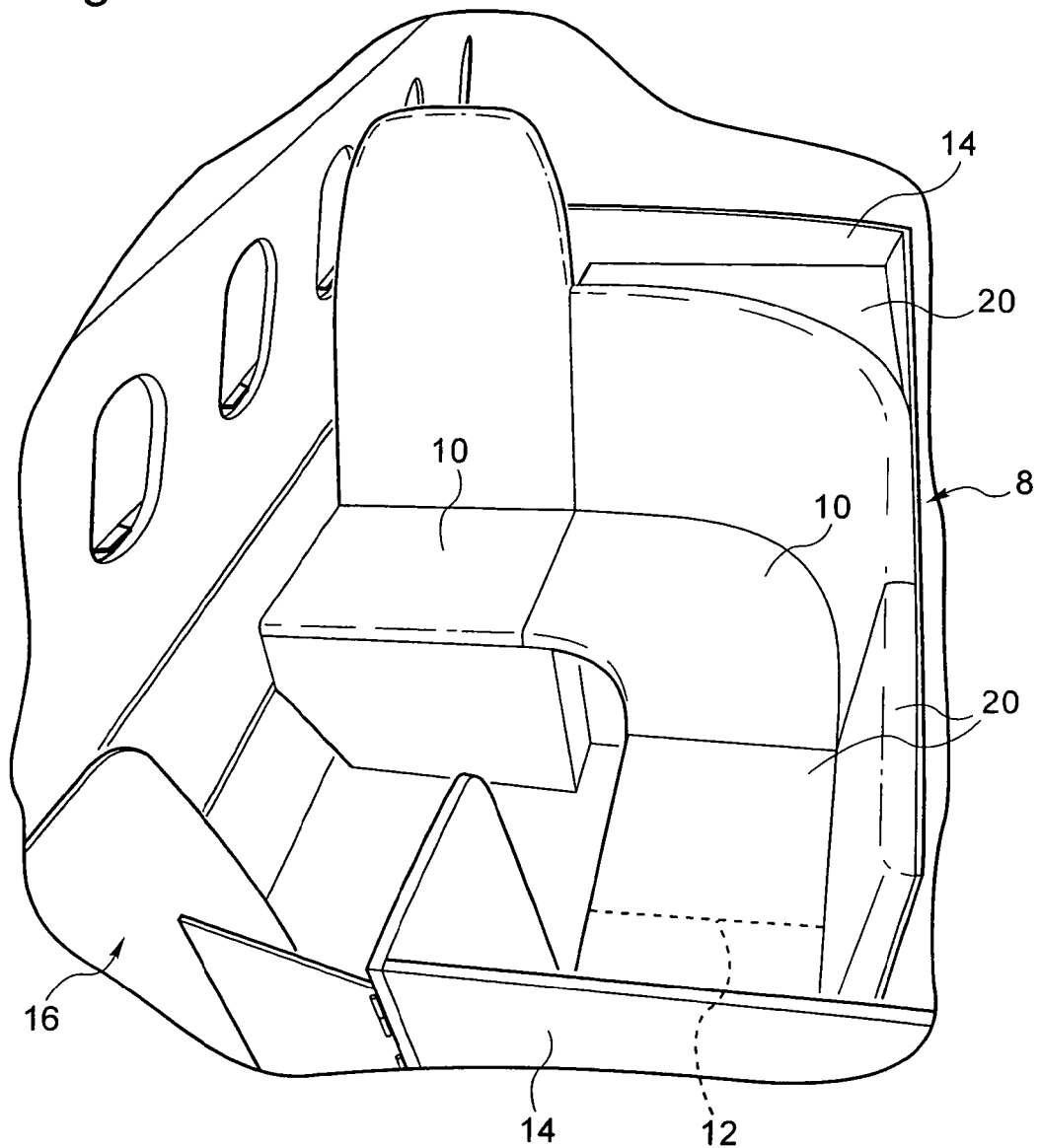
FIG. 3 is a module according to the invention when it is intended for a first-class space.

FIG. 3 illustrates the same module as that illustrated in FIG. 2, when it is configured to accommodate one first-class passenger. In this configuration, separating partition 18 is made to disappear by retracting it between seats 10 or by removing it and placing it in a reserve space provided for this purpose.

In the configuration example illustrated in FIG. 3, one seat 10 of double module 8 is in upright position, while the other seat is in its position converted to a bed. The seat converted to a bed is transformed to a banquette by means of foamed-plastic elements 20, which form in particular the back of the banquette and possible additions to the bottom. These foamed-plastic elements 20 can be fastened by means of hook and loop tapes (known by the registered trademark Velcro), by means of snap-in studs or by any other means.

In an advantageous embodiment, all of the foamed-plastic elements and possible cushions are kept in the space available under seats 10. Access to this storage space can be achieved via a hatch provided for this purpose in side wall 14 or directly via the front of seat 10. If this seat is equipped with a leg rest, this is raised to permit access to the storage space. It is also possible to provide for storage of foamed-plastic elements 20 in accessory units 12. This storage space can be extremely roomy, and may extend without interruption under both seats 10 of the module. Thus it can accommodate foamed-plastic elements 20 of large size.

The arrangements shown for a first-class module are given as non-limitative examples. By adapting the form (and number) of foamed-plastic elements, it is possible to conceive of a quasi-infinity of different arrangements.

As follows from the foregoing description, the transformation of a double module 8 intended to accommodate two business-class passengers to a double module intended to accommodate one first-class passenger can be achieved quickly. No structural element has to be displaced. It is sufficient merely to incline the seats or to return them to upright position, to shift a partition and to organize foamed-plastic elements. These elements are preferably available in the module itself or may be stored at some other place in the aircraft (in the cabin or even in the hold).

With the concept presented in the foregoing, it becomes possible to transform a first-class space to a business-class space in only three hours, whereas such a transformation in prior art aircraft generally takes five days. It becomes conceivable to change the configuration of the aircraft during a scheduled stop. Thus it is possible to modify the interior of an aircraft cabin from one flight to another. This is naturally highly advantageous for the airline companies, which can therefore adapt the interior arrangements of the cabin for each flight as a function of the reservations received. In this way the profitability of the space dedicated to first class and to business class in the aircraft is increased.

It is noted in FIG. 1 that not only double modules 8 such as described hereinabove but also single modules 22 are provided in business class. This makes it possible to optimize the space available in the aircraft cabin. The example shown therefore makes it possible to have seven passengers abreast in business class. That represents three double modules 8 and one single module 22. Such a single module 22 corresponds to one half of a double module 8. Such a module is also disclosed in French Patent 2843730, especially in FIG. 14 of that document, and in the corresponding description. When part of business-class space 4 is transformed to first-class space, there then are, as illustrated in FIG. 1, three double modules 8, permitting three first-class passengers to travel abreast. In first class zone 2, single modules 22, as illustrated in FIG. 1, are then covered up and can be used, for example, as storage space for the baggage of the travelers in first-class zone 2.

The present invention is not limited to the preferred embodiment described hereinabove as a non-limitative example. It also relates to all alternative embodiments that can be understood by the person skilled in the art within the scope of the claims hereinafter.

The invention claimed is:

1. An aircraft cabin, comprising:
   a module for aircraft passenger(s), the module including:
   two seats disposed beside one another and oriented generally along the axis of the cabin in the same direction, each of said two seats being convertible to a berth independently of any other seat,
   a side wall surrounding the two seats, at least partly,
   an opening provided in the side wall to permit access to the module, and
   a partition separating the two seats, said partition being displaceable from a first position, in which the partition separates the two seats, to a second stored position, in which the partition does not form a barrier between the two seats, wherein
   said opening faces said two seats,
   said opening is provided in front of said two seats along said same direction in which said two seats are oriented,
   said partition extends substantially perpendicular to a portion of said side wall defining said opening in said side wall, and
   said side wall extends only along a partial height of the cabin.

2. The aircraft cabin according to claim 1, wherein the module includes foamed-plastic elements to shape a layout of the interior space of the module according to a desired configuration.

3. The aircraft cabin according to claim 2, wherein the elements transform a berth to a banquette with a back.

4. The aircraft cabin according to claim 2, wherein the module includes a storage space to accommodate the elements.

5. The aircraft cabin according to claim 4, wherein the storage space is disposed under the seats.

6. The aircraft cabin according to claim 5, wherein a hatch provided in the side wall permits access to the storage space.

7. The aircraft cabin according to claim 1, wherein the side wall surrounding the two seats defines a substantially rectangular space, the two seats occupying substantially the entire width of that space and being disposed at one end thereof.

8. The aircraft cabin according to claim 7, wherein the side wall has an opening disposed facing the seats and in middle position relative thereto.

9. The aircraft cabin according to claim 1, wherein the partition is a partition that slides between a first high position, in which it achieves separation between the two seats, and a second low position, in which it is entirely retracted between the two seats.

10. The aircraft cabin according to claim 1, wherein the partition is a removable partition.

11. The aircraft cabin according to claim 10, wherein a reserve space is provided to accommodate the partition when said partition is removed.

12. The aircraft cabin according to claim 1, wherein each seat has a fixed frame.

13. The aircraft cabin according to claim 12, wherein the module includes a supplementary berth that cooperates with the seat to form a substantially plane surface capable of accommodating a passenger in recumbent position.

14. The aircraft cabin according to claim 1, further comprising a plurality of modules.

15. The aircraft cabin according to claim 14, wherein said cabin defines at least two zones including a first zone and a second zone,
   wherein said first zone includes a plurality of modules, each module of the first zone having a partition in a position in which the partition does not form a barrier between the two seats of the module, a first seat of each module of the first zone being converted into a first berth and a second seat of the module of the first zone not being converted into a berth,
   wherein said second zone includes a plurality of modules, each module of the second zone having a partition in a position in which the partition separates the two seats of the module of the second zone, and
   wherein the seats of the modules in the first zone are identical to the seats of the modules in the second zone.

16. An aircraft comprising at least one module according to claim 1.

17. The aircraft cabin according to claim 1, wherein said two seats includes a first seat and a second seat, said first seat having a first seat portion and a first back portion, said second seat having a second seat portion and a second back portion, wherein said first and second seat portions are distinct from each other.

18. The aircraft cabin according to claim 17, wherein the first seat portion is movable to convert the first seat to a first berth, and the second seat portion is movable independently of said first seat portion to convert the second seat to a second berth.

19. The aircraft cabin according to claim 18, wherein, in a first configuration of said module, said first seat is converted into said first berth while said second seat is not converted into said second berth, and wherein in a second configuration of said module, said first seat is not converted into said first berth while said second seat is converted into said second berth.

20. The aircraft cabin according to claim 18, wherein said first berth extends to a first side of said opening and said second berth extends to a second side of said opening, said first and second sides of said opening being opposite each other.

21. The aircraft cabin according to claim 17, wherein the first seat portion is of a size equal to that of said second seat portion.

22. The aircraft cabin according to claim 1, wherein a height of said side wall is between 0.60 m and 1.50 m.

* * * * *